United States Patent

Kondo et al.

[15] 3,647,981

[45] Mar. 7, 1972

[54] SWITCHING SYSTEM HAVING MEANS FOR IDENTIFYING LOCATIONS OF BOTH INCOMING AND OUTGOING TRUNK CIRCUITS

[72] Inventors: Eiroku Kondo; Hirotaka Usuda; Hidemasa Suzuki; Tuneo Furuya, all of Yokohama, Japan

[73] Assignee: Hitachi, Ltd., Tokyo, Japan

[22] Filed: Jan. 13, 1970

[21] Appl. No.: 2,520

Related U.S. Application Data

[63] Continuation of Ser. No. 667,907, Sept. 15, 1967, abandoned.

[30] Foreign Application Priority Data

Sept. 17, 1966 Japan....................................41/87509

[52] U.S. Cl.............................................179/18 AH, 179/22

[51] Int. Cl..........................................................H04m 7/00

[58] Field of Search..........179/18 AH, 18 ET, 18 FH, 18 GE, 179/22

[56] References Cited

UNITED STATES PATENTS

| | | | |
|---|---|---|---|
| 3,382,324 | 5/1968 | Shirasu et al. | 179/22 |
| 3,264,415 | 8/1966 | Burns et al. | 179/18 AH |

*Primary Examiner*—Kathleen H. Claffy
*Assistant Examiner*—Thomas W. Brown
*Attorney*—Craig, Antonelli and Hill

[57] ABSTRACT

An improved circuit arrangement in a crossbar switching system, for identifying the location in switch frame of an outgoing trunk, according to which arrangement said identification of the location of an outgoing trunk is achieved by using a trunk number group and an incoming trunk, thus a number of circuit components are economized.

3 Claims, 2 Drawing Figures

Patented March 7, 1972 3,647,981

2 Sheets-Sheet 1

INVENTORS

EIROKU KONDO, HIROTAKA USUDA, HIDEMASA SUZUKI and TUNEO FURUYA

BY Craig, Antonelli, Stewart & Hill

ATTORNEYS

INVENTORS
EIROKU KONDO, HIROTAKA USUDA,
HIDEMASA SUZUKI and TUNEO FURUYA
BY
Craig, Antonelli, Stewart & Hill
ATTORNEYS

SWITCHING SYSTEM HAVING MEANS FOR IDENTIFYING LOCATIONS OF BOTH INCOMING AND OUTGOING TRUNK CIRCUITS

CROSS-REFERENCE TO RELATED APPLICATION

This application is a continuation application of U.S. Ser. No. 667,907 filed on Sept. 15, 1967, now abandoned.

BACKGROUND OF THE INVENTION

1. Field of the Invention

This invention relates to the crossbar switching system, more particularly a circuit arrangement for identifying the location in switch frame of an outgoing trunk in such a system.

2. Description of the Prior Art

A crossbar switching system, generally consists of switch frames, subscriber's lines, incoming trunks, outgoing trunks, intraoffice trunks accommodated in the switch frames, and various kinds of common control apparatuses, such as markers, registers, senders (or combined registers and senders, namely, register-senders), as well as various connectors and links. Each marker controls the switch frames and sets up the connection between any one of the subscriber's lines and the outgoing trunks or the incoming trunks. For setting up the above connection, the marker must identify the locations on the switch frames of the subscriber's line and the trunk which are to be connected together.

In the conventional crossbar switching system, the location of an outgoing trunk in the switch frame is identified by the marker at the same time that the latter selects the one required from a number of outgoing trunks, while the location of an incoming trunk is first extracted by a trunk number group and then identified by the marker. In some kinds of crossbar switching systems, the location data of an outgoing trunk are required at the time when a marker does not operate for selecting the outgoing trunk. In order to answer this requirement, the location data storage relays are provided in switchable apparatuses, for example, registers.

Thus, in the conventional system, the locations of an outgoing trunk and an incoming trunk are identified in different manners, or with different circuits, and a number of storage relays for outgoing trunk location data are necessary.

SUMMARY OF THE INVENTION

The object of this invention is to provide an economical and useful trunk identifying circuit arrangement.

According to the invention, the location of an outgoing trunk is identified by using a trunk number group as well as an incoming trunk. By this feature, a marker identifies the location of any outgoing trunk at any time in the same manner as an incoming trunk, and location data storage relays are not necessary.

Now, this invention will be described hereunder in detail with references to the accompanying drawings.

DESCRIPTION OF THE PREFERRED EMBODIMENT

Figure 1:
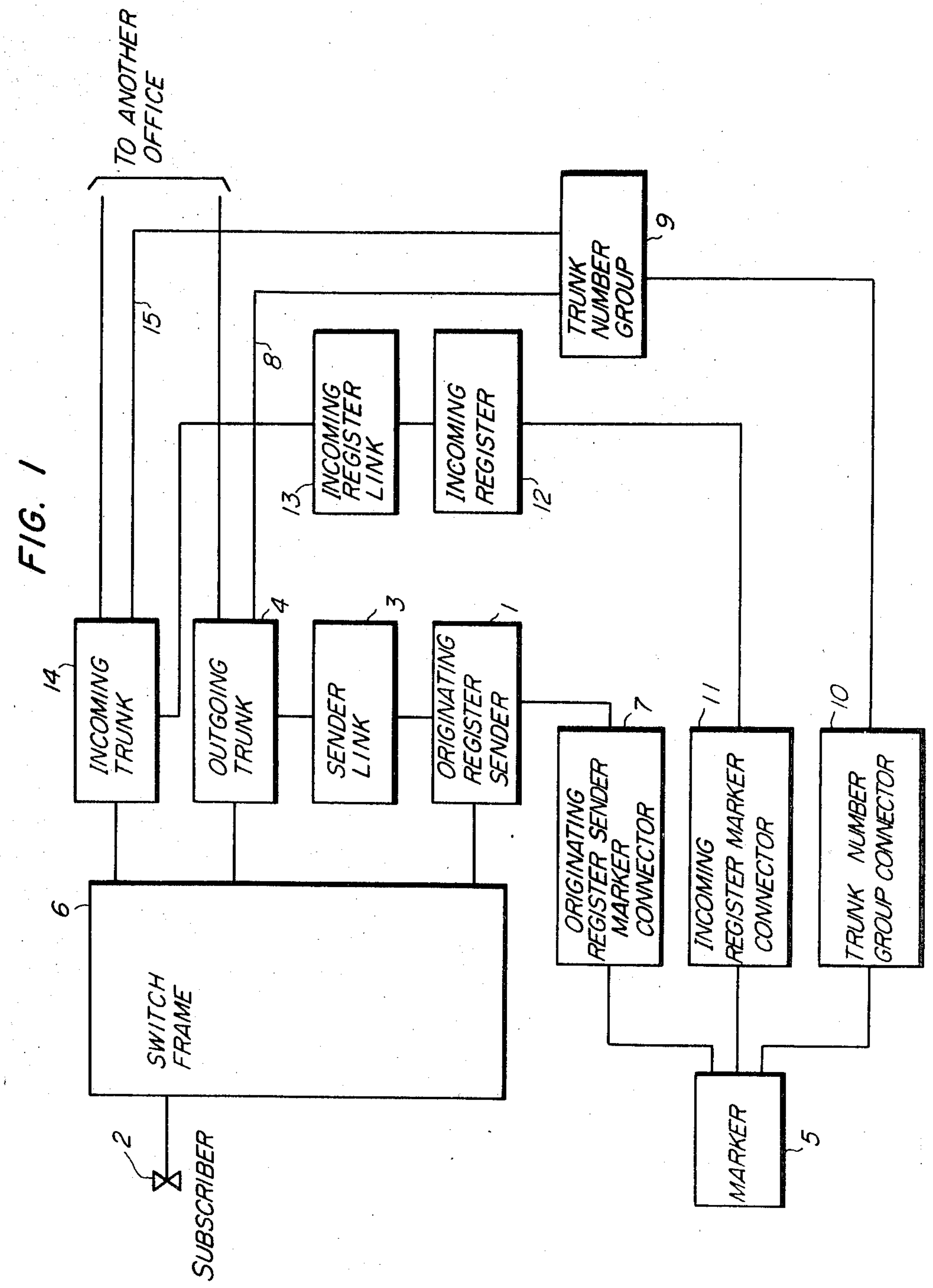
FIG. 1 is a block diagram of a crossbar switching system according to this invention.

Referring to FIG. 1, there is shown a typical crossbar switching system having a switch frame 6 to which a subscriber 2, an outgoing trunk 4, an incoming trunk 14 and an originating register-sender 1, and a marker 5 are connected. The incoming trunk 14 is connected to an incoming register 12 via an incoming register link 13 and to a trunk number group 9 via jumper wiring 15. The outgoing trunk is connected to the originating register sender 1 through a sender link 3 and to the trunk number group 9 by a jumper wiring 8. The originating register-sender 1, incoming register 12 and trunk number group 9 are connected with the marker 5 by means of connectors, or an originating register-sender marker connector 7, incoming register marker connector 11 and a trunk number group connector 10, respectively.

Now, let us assume that the subscriber 2 originates an outgoing call. The marker connects the subscriber 2 to the originating register sender 1. The originating register-sender 1 receives a telephone number dialed by the subscriber 2 and identifies by a few digits of the number that the call is an outgoing one, starting the marker 5 to seize an outgoing trunk. The marker 5 selects the outgoing trunk 4 and closing cross points in the sender link 3, connects this trunk 4 with the originating register-sender 1. Simultaneously with the above operation, the marker 5 attempts to set up the connection between the calling subscriber 2 and the outgoing trunk 4. If there is no idle channel between the both 2 and 4, the marker 5 is released. In this case, the originating register-sender 1 actuates the marker 5 again after the reception of all the digits of called telephone numbers, and the marker 5 tries again to set up the connection between the calling subscriber 2 and the outgoing trunk 4. For this setting up, the marker 5 must identify the location of the outgoing trunk 4. The marker 5, when reactuated by the originating register-sender 1, extracts the location of the outgoing trunk 4 on the switch frame 6, by the route through the marker 5, the originating register-sender marker connection 7, the outgoing trunk 4, the jumper wiring 8, the trunk number group 9, the trunk number group connector 10, and the marker, in the mentioned order.

As may be known, according to the known method, the location of an incoming trunk is extracted by the route through the incoming register marker connector 11, the incoming register 12, the incoming register link 13, the incoming trunk 14, the trunk number group 9, the trunk number group connector 10, and the marker 5, in the mentioned order. Therefore, according to the invention, the location of an outgoing trunk is identified in the same manner as for an incoming trunk, using a trunk number group.

Figure 2:
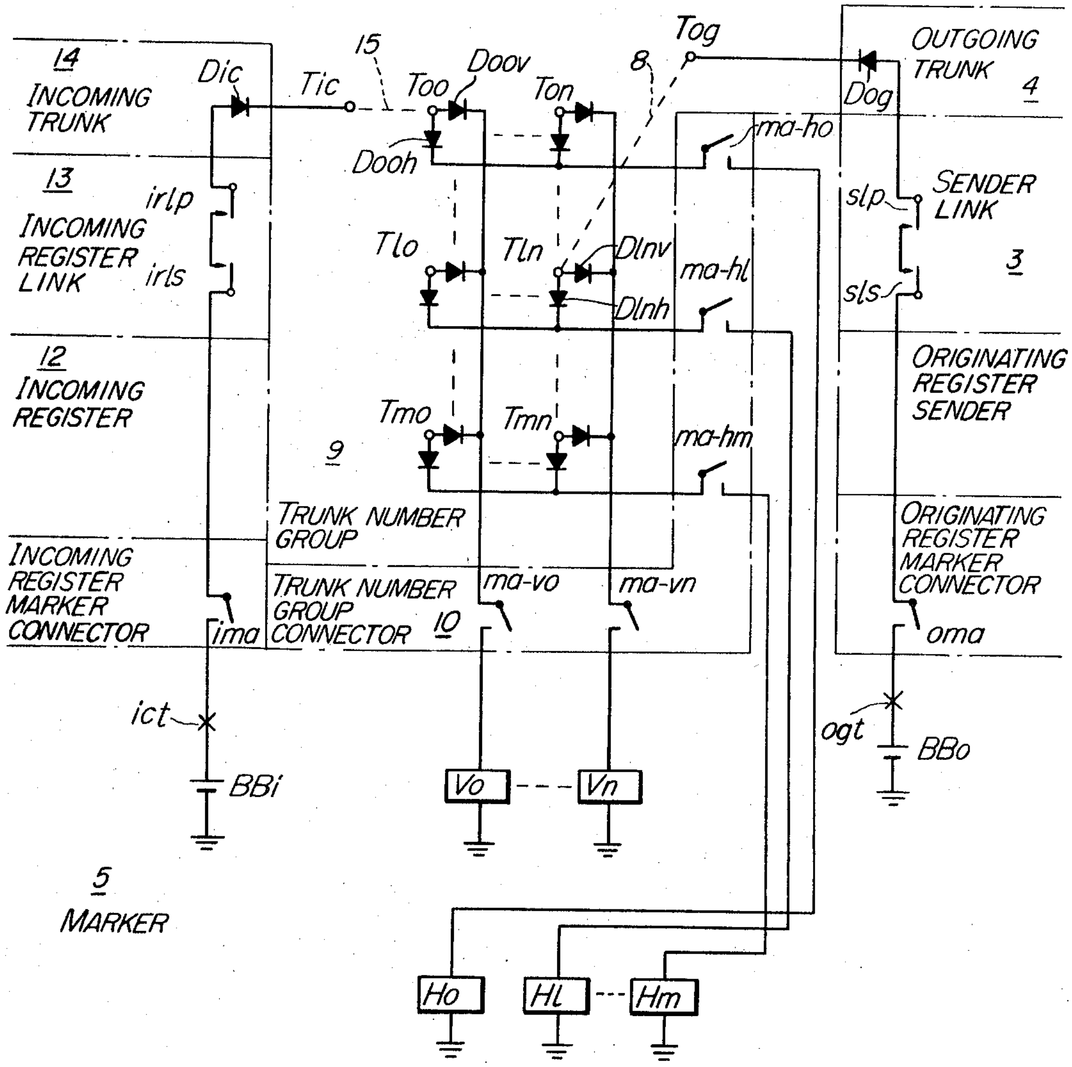
FIG. 2 is a simplified connection diagram of the circuit according to this invention, which is the essential part of the system shown in FIG. 1.

FIG. 2 shows the trunk location identifying circuits covered by the trunk number group 9 and other related apparatuses shown in FIG. 1. In more detail, the trunk number group 9 is a rectifier matrix network which consists of matrix arrayed rectifiers Dooh, Doov, Dlnh, Dlnv, etc., and terminals Too, Tln and so on. These rectifiers are connected, through the trunk number group connector contacts *ma–ho* to *ma–hm* and *ma–vo* to *ma–vn*, to the location identifying relays Ho to Hm and Vo to Vn in the marker 5, while the terminals, for example, Too and Tln are connected by jumper wirings 15 and 8 to an incoming trunk terminal Tic and an outgoing trunk terminal Tog, respectively, each of these jumper wirings being wired according to the location of the corresponding trunk.

In the marker 5, there are provided booster batteries BBi and BBo, and make-contacts ict and ogt which close when the marker 5 identifies the location of an incoming trunk and outgoing trunk, respectively.

At the time when the marker 5 identifies the location of the incoming trunk 14, and a contact *ima* in the incoming register marker connector 11 and the cross points irlp and irls are closed, the following two circuits are completed, that is, one by the route through the booster battery BBi, the contact ict, the contact ima, the incoming register 12, the cross-points irls and irlp in series, a rectifier Dic, the terminal Tic, jumper wiring 15, the terminal Too, the rectifier Doov, the contact *ma–vo* and the relay Vo, and the other branching from the former at the terminal Too and passing through the rectifier Dooh, the contact *ma–ho* and the relay Ho. Thus, relays Ho and Vo operate.

On the other hand, the marker 5 identifies the location of the outgoing trunk by the operation of the relays Hl and Vn, the former relay being energized through the route of the booster battery BBo, the contact ogt, the contact oma, the originating register sender 1, the cross-points sls and slp, the rectifier Dog, the terminal tog, the jumper wiring 8, the terminal Tln, the rectifier Dlnh, the contact *ma–hl* and the relay Hl, and the latter relay being energized by the route branched from the former at the terminal Tln and passing through the rectifier Dlnv, the contact *ma–vn* and the relay Vn.

We claim:

1. A crossbar switching system for connecting a subscriber in an office to outgoing and incoming trunks, which have lines extending to an office separate from the office in which said subscriber is located, said system comprising:

a switch frame connected between subscriber lines and said incoming and outgoing trunks for providing a path between said subscriber and said respective trunks;

a marker circuit;

an originating register sender, connected between said marker circuit and said switch frame;

a sender link for connecting said originating register sender to said outgoing trunks;

means for connecting said marker circuit to said originating register sender, whereby said marker circuit may identify and select an outgoing trunk to be connected through said switch frame to said subscriber;

means for enabling an incoming trunk to be connected through said switch frame to said subscriber including an incoming register link, an incoming register and an incoming register marker connector connected in series between said incoming trunks and said marker; and means for identifying the location of both outgoing and incoming trunks comprising a trunk number group circuit and connector therefor, connected to said marker and respective jumper conductors connected between said respective incoming and outgoing trunks and said trunk number group circuit, whereby said marker may identify the location of an outgoing trunk and an incoming trunk to be connected through said switch frame to a subscriber through the common use of said trunk number group circuit.

2. A system according to claim 1, wherein said trunk number group circuit comprises a rectifier matrix network, each respective column and row of which includes a common electrode connection of a pair of diodes, the other electrodes of each diode in each respective row and column being connected in common said trunk number group connector includes a plurality of switches, one side each of which is connected to a respective common connection of said other electrodes of said diodes, while the other sides of said switches are connected to respective column and row relays of said marker.

3. A system according to claim 2, wherein said jumper wires from said incoming and outgoing trunks are connected to the common connections of said one electrode of each pair of diodes in a predetermined row and a predetermined column of said trunk group circuit, and wherein said marker circuit includes means for supplying battery potential through a series connection of said incoming register marker connector, incoming register, incoming register link and incoming trunk, and said originating register marker connector, originating register sender, sender link and said outgoing trunk.

* * * * *